Aug. 7, 1951 W. J. MORELAND ET AL 2,563,545

SOUND RECORDING AND REPRODUCING APPARATUS

Filed June 22, 1946 4 Sheets-Sheet 1

INVENTORS
WILLIAM J. MORELAND
HAROLD G. FOOTE
BY
R G Richardson
ATTY.

Aug. 7, 1951 W. J. MORELAND ET AL 2,563,545

SOUND RECORDING AND REPRODUCING APPARATUS

Filed June 22, 1946 4 Sheets-Sheet 2

INVENTORS
WILLIAM J. MORELAND
HAROLD G. FOOTE
BY R B Richardson
ATTY

Aug. 7, 1951 W. J. MORELAND ET AL 2,563,545

SOUND RECORDING AND REPRODUCING APPARATUS

Filed June 22, 1946 4 Sheets-Sheet 3

INVENTORS
WILLIAM J. MORELAND
HAROLD G. FOOTE

BY R. G. Richardson

ATTY.

INVENTORS
WILLIAM J. MORELAND
HAROLD G. FOOTE
BY R G Richardson
ATTY

Patented Aug. 7, 1951

2,563,545

UNITED STATES PATENT OFFICE 2,563,545

SOUND RECORDING AND REPRODUCING APPARATUS

William J. Moreland, Delavan, and Harold G. Foote, Fontana, Wis., assignors to The George W. Borg Corporation, Chicago, Ill., a corporation of Delaware Application June 22, 1946, Serial No. 678,570

28 Claims. (Cl. 179—100.2)

The present invention relates in general to sound recording and reproducing apparatus, and more in particular to apparatus of this character in which sound is recorded electro-magnetically on a para-magnetic wire or similar medium.

The object of the invention is to produce a sound recording and reproducing apparatus, using a wire as the recording medium, which is well adapted for use as an office dictating and transcribing machine.

The invention and various features thereof will be described fully hereinafter with references to the accompanying drawings, in which—

Figure 1:
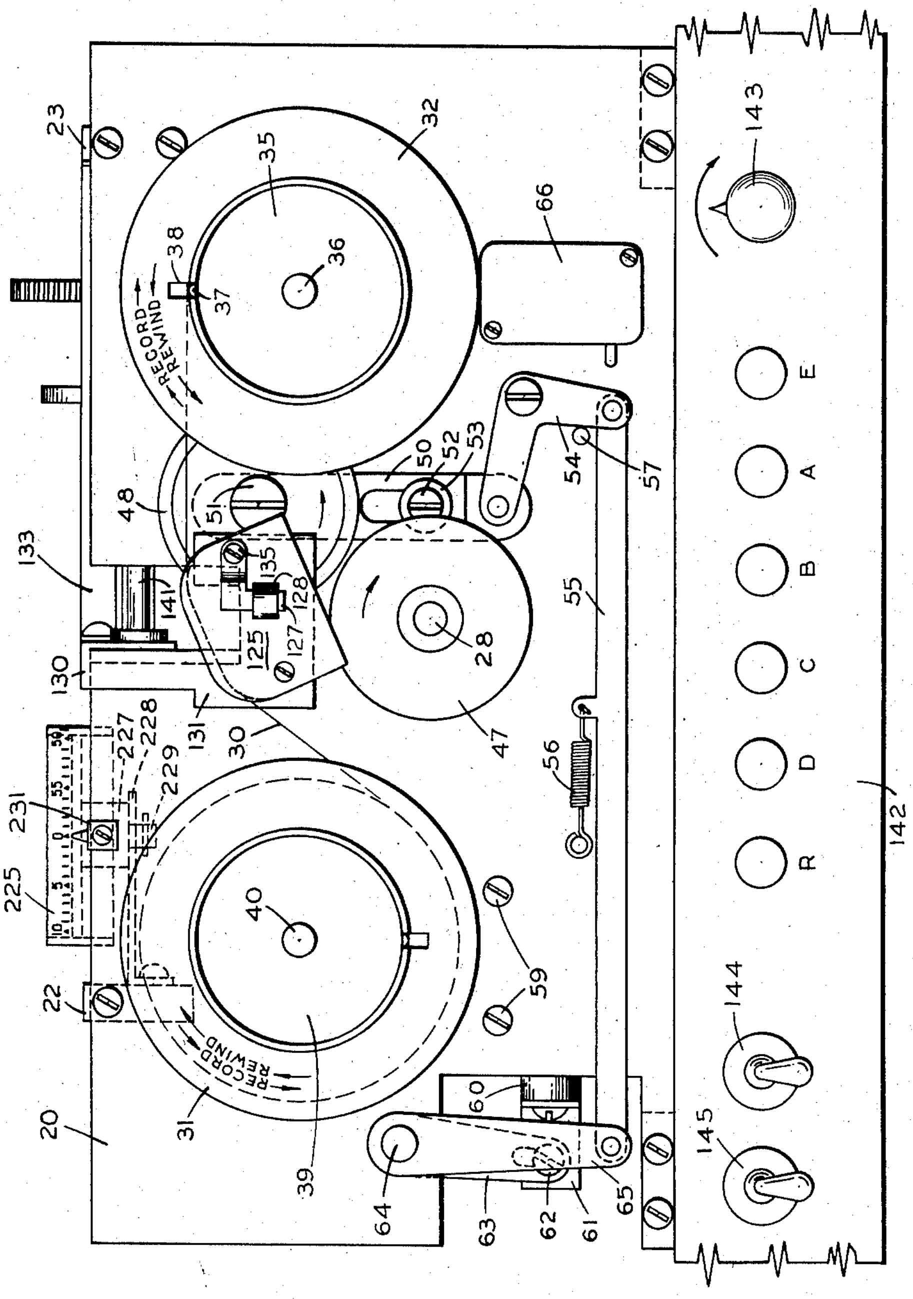
Fig. 1 is a front view of the mechanical unit employed for handling the wire.

The mechanical unit for handling the wire will be described first, reference being had to Figs. 1, 2 and 3.

The various parts are mounted on a frame which includes two vertically disposed frame plates 20 and 21. These plates are held together in spaced relation by the cross members 22 and 23, at the top, and by the cross members 24 and 25, at the bottom. The frame plates may be fastened to the cross members by screws, as shown in the drawings.

Figure 2:
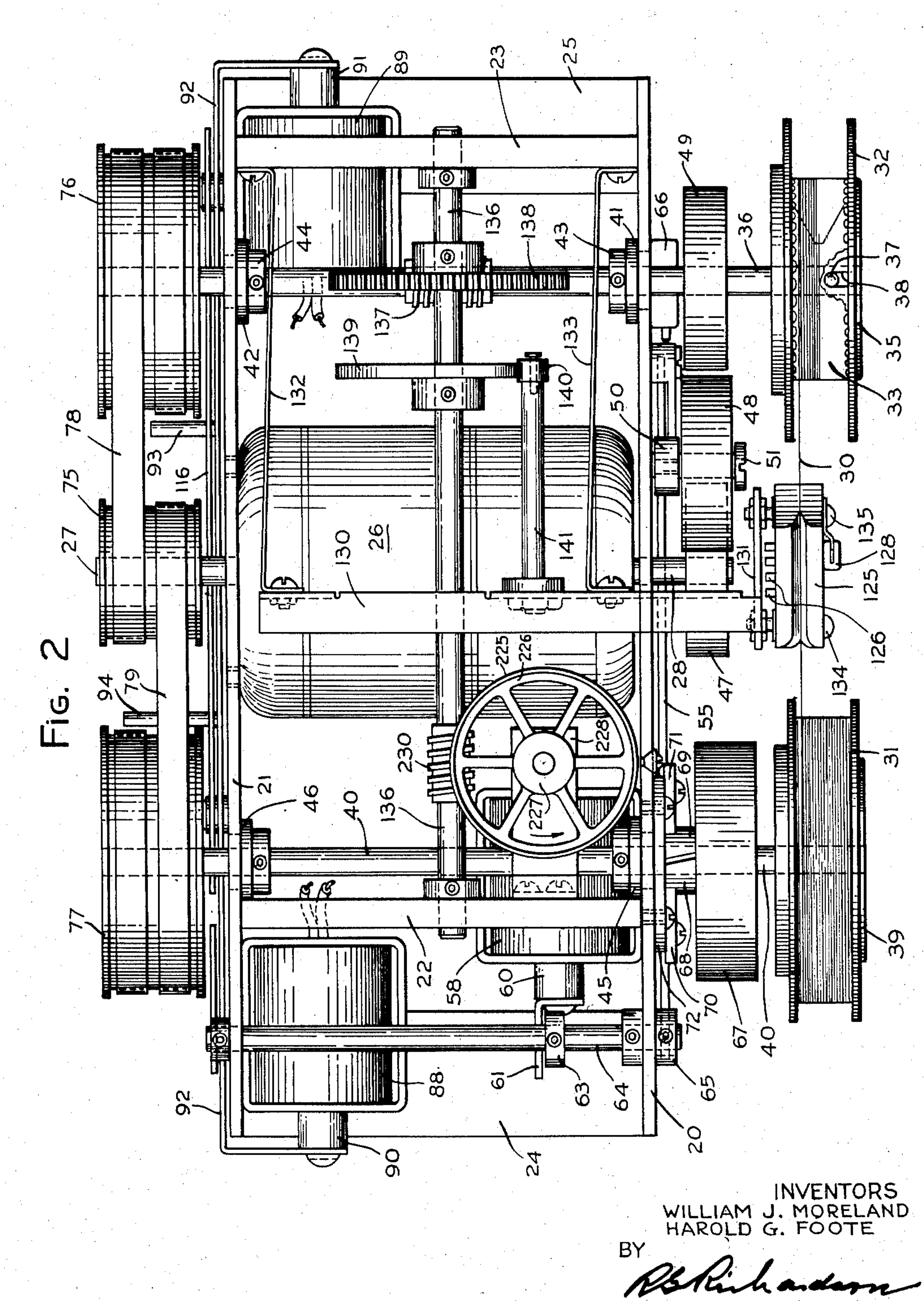
Fig. 2 is a top view of the mechanical unit.

The reference character 26, Fig. 2, indicates a motor which is mounted on the frame in any suitable manner. As indicated in Fig. 2, the motor is attached to frame plate 21 by means of two of the through bolts which hold the motor frame together. These two bolts are somewhat longer than usual and are threaded into tapped holes in the frame plate 21. The motor 26 may be an A. C. capacitor type motor and has two output shafts running at different speeds. Shaft 27 is the armature shaft and preferably has a speed of 3600 R. P. M. Shaft 28 is connected to shaft 27 by speed reducing gears and preferably has a speed of 240 R. P. M.

The wire 30 is of para-magnetic material and is carried on spools 31 and 32. Spool 31 may for convenience be referred to as a supply spool and spool 32 as a take up spool. The spools are, however, identical and interchangeable. The wire 30 is attached to spool 32 in known manner by means of a leader 33, which is wrapped several times around the spool. This leader is made of thin flexible plastic material, has serrated or scalloped edges, and is slightly wider than the spool. The other end of the wire has a similar leader by means of which it is attached to spool 31. These leaders are long enough so that when the wire is wound entirely off from one spool on to the other, as from spool 32 to spool 31, the leader at the end of the wire, in this case leader 33, will be partly wound on spool 31 before it is entirely unwound from spool 32, thus preventing uncoiling of the outer turns of wire on the former spool.

The spool 32 is removably mounted on a flanged hub 35, which is fixed on the shaft 36. The spool is retained on the hub by a spring pressed ball 37, mounted in a radial hole in the hub, which enters a slot 38 in the spool when it is pressed on to the hub. If the spool is not perfectly oriented it may be rotated relative to the hub until the ball enters the slot. Spool 31 is mounted on the flanged hub 39, fixed on shaft 40, and is retained on the hub in the same way.

The shaft 36 is rotatably mounted on the frame, by means of the flanged bearing bushings 41 and 42, which are fitted into openings in the frame plates 20 and 21, respectively. Two collars 43 and 44, secured to the shaft 36 by means of set screws, prevent end wire movement thereof. The shaft 40 is rotatably mounted on the frame in the same way, by means of the flanged bearing bushings 45 and 46.

During the operation of the machine for recording, and also for reproducing, the take up spool 32 is driven by the motor 26 at slow speed in a clockwise direction as seen in Fig. 1. This may be referred to as the "slow forward" drive, and is effected by means of a roller 47 on the motor shaft 28, a roller 49 on the shaft 36, and a rubber tired idler roller 48. The latter roller is mounted on the vertically slidable member 50 by means of a stud or shoulder screw 51. The member 50 is supported against the frame plate 20 by means of the washer 53 and the shoulder screw 52, Fig. 1, which passes through a slot in member 50 and is threaded into the frame plate. It will be noted also that the member 50 is pivotally connected to the bell crank lever 54.

The member 50 is normally held in the position in which it is shown in Fig. 1, with roller 48 out of engagement with rollers 47 and 49, by means of the spring 56, which urges the link 55 to the left and holds the lower arm of lever 54 against the stop pin 57. Roller 48 is brought into engagement with rollers 47 and 49 by means of the solenoid 58, Fig. 2, which is mounted on the back of frame plate 20 by means of the two screws 59, Fig. 1. The core 60 of the solenoid carries an L-shaped bracket 61 which is connected to the crank 63 by means of the shoulder screw 62. This screw passes through a slot in the crank 63 and is threaded into the bracket 61. The crank 63 is fixed on the shaft 64, which has bearings in frame plates 20 and 21. Another crank 65 connects the shaft 64 with the link 55. When solenoid 58 is energized, the core 60 and bracket 61 move to the right as seen in Fig. 1 and the shaft 64 is rotated by means of crank 63. The shaft 64 moves the link 55 to the right by means of crank 65, and the link 55, by means of bell crank lever 54, pulls the member 50 downward and thus operatively engages roller 48 with the rollers 47 and 49.

The reference character 66 indicates a normally closed micro-switch of well known construction. This switch is mounted on the frame plate 20 and is held open during slow forward drive by the bell crank lever 54.

The reference character 67 indicates a centrifugal switch. This switch is associated with the shaft 40 and may be of any suitable and known type. As shown in Fig. 2, it comprises two semi-cylindrical members 68 and 69 having lugs 70 and 71 by means of which they are mounted on the disc 72. The latter is made of insulating material and is secured to the frame plate 20. The lugs 70 and 71 are the terminals of the switch. The casing 67 is mounted on shaft 40 and contains three pivoted switch members, electrically connected but insulated from shaft 40, which are held in contact with the semi-cylindrical members 68 and 69 by means of springs, thereby normally maintaining the switch closed. The springs are adjusted so that the switch opens when the shaft 40 rotates at a speed slightly higher than the slow forward speed.

The slow forward drive which has been described is used during recording and reproducing. The machine also has a fast forward drive which makes it possible to skip a part of the record and bring a desired part thereof quickly to reproducing position. The motor shaft 27 is employed on the fast forward drive, as well as on the rewind drive.

Figures 3, 5:
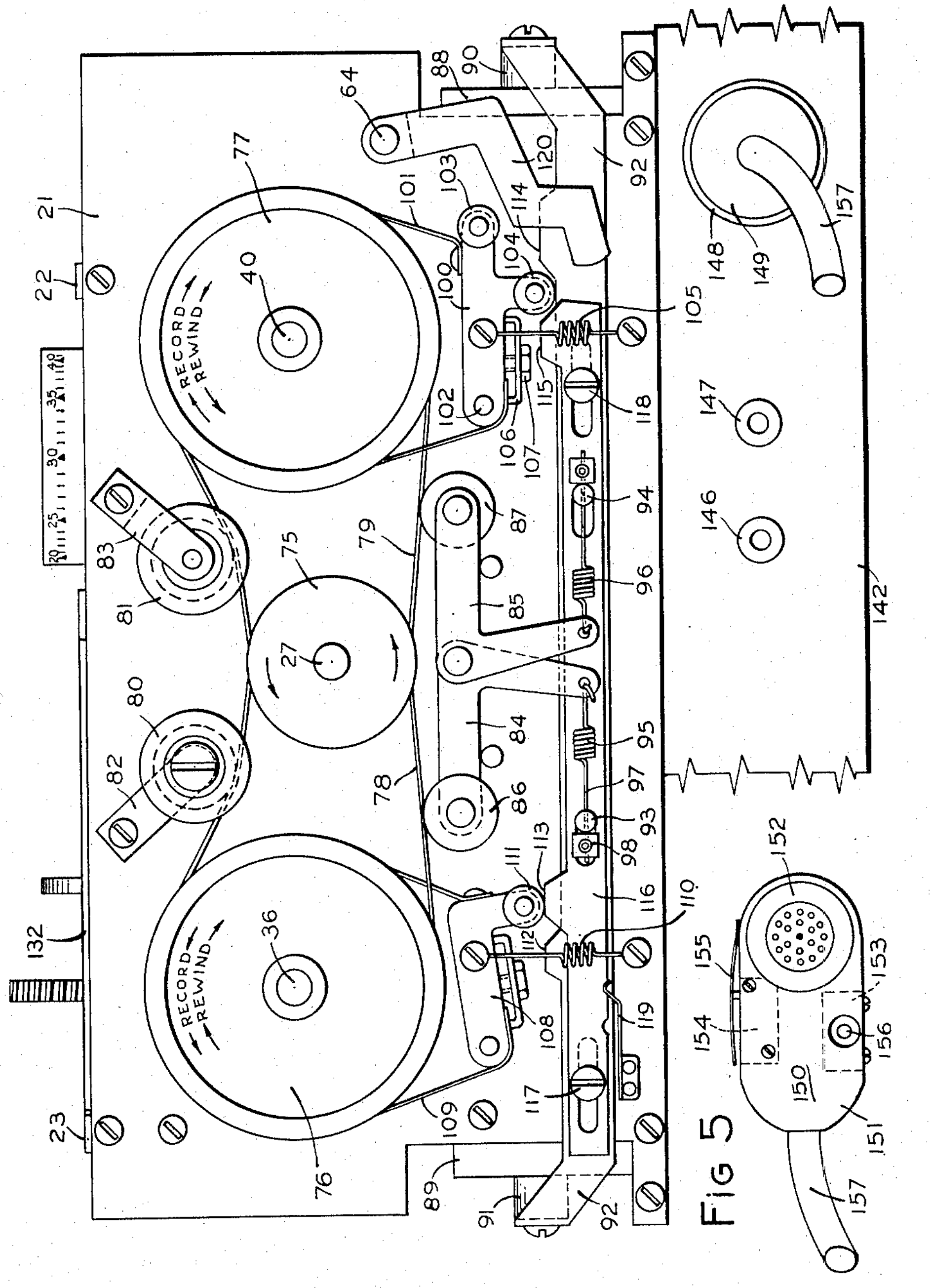
Fig. 3 is a rear view of the same.
Fig. 5 is a view of the hand microphone and switching unit employed for dictation.

The motor shaft 27 carries a pulley 75, Figs. 2 and 3, which may be coupled by means of belts 78 and 79 to the pulleys 76 and 77 carried on shafts 36 and 40, respectively. The belts are normally loose, so that pulley 75 can rotate freely without applying any driving torque to either pulley 76 or 77. The guide pulleys 80 and 81 are mounted on the adjustable brackets 82 and 83 and afford means for adjusting the belts 78 and 79, respectively.

The belts are rendered selectively operative for driving purposes by means of the bell crank levers 84 and 85 carrying the idler rollers 86 and 87 which are adapted to engage the belts 78 and 79, respectively. The levers 84 and 85 are selectively operated by means of the fast forward and rewind solenoids 88 and 89, respectively. These solenoids are mounted on the inside of frame plate 21, as shown in Fig. 2, by means of screws such as the screws 59, Fig. 1, which secure the solenoid 58 to frame plate 20. The cores 90 and 91 of the solenoids are connected together by the bar 92, shown clearly in Figs. 2 and 3. This bar is provided with the two studs 93 and 94, which are connected with the levers 84 and 85 by springs 95 and 96, respectively. Each spring includes a straight end section which passes through a diametral hole in the associated stud. In the case of spring 95 this end section is indicated at 97. Just beyond the stud 93 there is a short piece of perforated rod 98 which is secured to the end section 97 of the spring by a set screw. With this construction the stud 93 pulls on the spring when it moves to the left but is free to slide along 97 when it moves to the right. The spring 96 is attached to stud 94 in the same way.

When the fast forward solenoid 88 is energized, the bar 92 is moved to the left, as seen in Fig. 3. The stud 93, being fixed to bar 92, accordingly moves to the left also and operates the bell crank lever 84 by means of spring 94. The roller 86 is thus pressed against the belt 78, tightening the belt, and causing the pulley 75 to drive the pulley 76. The direction of rotation is shown by the arrows on these pulleys and is such that the spool 32, Fig. 1, is driven in the same direction as on the slow forward drive.

When the rewind solenoid 89 is energized, the bar 92 is moved to the right and operates the bell crank lever 85 by means of stud 94 and spring 96. This operation tightens the belt 79 and causes the pulley 75 to drive the pulley 77. The direction of rotation, indicated by the arrows, is such that the spool 31, Fig. 1, is driven in a clockwise direction to rewind the wire 30 from spool 32 to spool 31.

Following the deenergization of each solenoid the bar 92 is restored substantially to the position in which it is shown in Fig. 3. Restoration is accomplished by the belts 78 and 79, reacting against the rollers 86 and 87.

The pulleys 76 and 77 are provided with brakes, together with means for selectively applying the brakes at times when overrun is apt to occur. This mechanism will now be described.

The brake for pulley 77 comprises the lever 100, pivoted at 102, the brake band 101 attached to lever 100, and the light spring 105, which tends to rotate the lever on its pivot in a clockwise direction. The brake band 101 may be made of untreated woven belting, the same as used for the belts 78 and 79, but rubber impregnated belting is preferred because of the greater coefficient of friction between the brake band and the face of the pulley. One end of the brake band 101 is more or less permanently attached to the lever 100 near the roller 103, while the other end is clamped against the lower side of the lever near the pivot 102 by means of the U-shaped piece 106 and the hexagonal headed screw 107. This arrangement makes it possible to adjust the length of the brake band. The spring 105 normally holds the brake band taut so that some friction is developed between the brake band and the face of the pulley when the pulley is rotating which retards the rotation. When the pulley is rotating in a clockwise direction the pull on the brake band aids the spring 105, that is, it tends to tighten the brake band, and a substantial braking action results. When the pulley is rotating in the opposite direction, however, the pull on the brake band tends to loosen it and the braking action is slight.

The brake for pulley 76 comprises the pivoted lever 108, the brake band 109 and the light spring 110. The construction and operation is the same as described in the case of the brake for pulley 77.

The brakes are self-actuating and are positively released by means of cam mechanism which will now be described.

There are four cams, two of which, cams 112 and 113, cooperate with the roller 111 on lever 108, while the other two, cams 114 and 115, cooperate with the roller 104 on lever 100. Cams 112 and 114 are carried on the bar 92, already described, while the cams 113 and 115 are carried on the auxiliary bar 116. The bar 116 extends parallel to bar 92 and is supported on the two shoulder screws 117 and 118 which pass through slots in bars 116 and 92 and are threaded into the frame plate 21. Washers on the shoulder screws are interposed between the two bars and between bar 92 and the frame plate 21 to hold the parts in spaced relation. The bar 116 has two positions, to which it is moved by the studs 93 and 94 on bar 92. These studs pass through slots in bar 116 as shown. In order to retain bar 116 in one or the other of its positions when not impelled to move by one of the studs a spring detent 119 is provided. This detent cooperates with two notches in the lower edge of bar 116.

In addition to the cam mechanism just described there is a lever 120 on shaft 64 which cooperates with the roller 103 on lever 100 and with the bar 116, as will be explained shortly.

When the bar 92 is in normal position, with neither the rewind solenoid 89 nor the fast forward solenoid 88 energized, the cams 112 and 114 are both inoperative and the brakes are both on so far as the bar 92 is concerned. The bar 116, however, always maintains one or the other of the brakes released, the brake which is released depending on the position of the bar. In its left hand position, the position in which bar 116 is shown in Fig. 3, the brake for pulley 76 is released while the brake for pulley 77 is on. The release of the brake for pulley 76 is accomplished by the cam 113 which is in engagement with roller 111 and has rotated the lever 108 on its pivot sufficiently to loosen the brake band 109.

It will be understood that the bar 116 is in its left hand position because of the previous energization of the slow forward solenoid or the fast forward solenoid, either of which is operative to move bar 116 from its right hand position to its left hand position. The rewind solenoid, when energized, moves the bar to its right hand position. It will be convenient now to explain the brake control operations which take place upon the energization and deenergization of these solenoids.

When the rewind solenoid 89 is energized, the bar 92 is moved to the right, the belt 79 is tightened by bell crank lever 85 to couple the pulley 77 to pulley 75, and the supply spool 31 is driven in the proper direction to rewind the wire 30 from spool 32 to spool 31. The movement of bar 92 to the right brings about the movement of the bar 116 from its left hand position to its right hand position, by the engagement of stud 94 with the right hand end of the slot in bar 116. The movement of bar 116 to its right hand position causes cam 115 to engage roller 104, rotate lever 100 on its pivot, and release the brake on pulley 77. The movement of bar 116 to its right hand position also causes the cam 113 to disengage roller 111 but the brake on pulley 76 is not applied because it is maintained released by cam 112 on bar 92, now moved to the position formerly occupied by cam 113.

During the rewinding operation, therefore, both brakes are released and the spools are able to rotate freely, imposing a minimum load on the motor. When the solenoid 89 is deenergized to stop the rewinding operation, the bar 92 restores to normal position, thereby uncoupling pulley 77 from pulley 75. The restoration of bar 92, by moving cam 112 out of engagement with roller 111, applies the brake on pulley 76. The brake on pulley 77 is not applied but is maintained released because the bar 116 remains in its right hand position. In consequence of this condition of the brakes, the take up spool 32 is rapidly retarded to a stop by the brake on pulley 76, while the supply spool 31, although otherwise freely rotatable, is brought to a stop by the pull on wire 30. The inertia of spool 31 therefore keeps the wire taut and eliminates any possibility of a backlash due to overrunning of spool 32.

It may now be assumed that the slow forward solenoid 58 is energized, thereby coupling the shaft 36 on which the take up spool 32 is mounted to the slow speed motor shaft 28. The spool 32 is now driven in the proper direction for recording or reproducing. The above referred to coupling operation involves the rotation of shaft 64 in a clockwise direction, as seen in Fig. 3 causing the lever 120 to move the bar 116 to its left hand position. The cam 115 is thus moved out of engagement with the roller 104 but the brake on pulley 77 is maintained released by the engagement of lever 120 with the roller 103. The brake on pulley 76 having been released by cam 113, both brakes are now in released condition, as was the case during the rewinding operation.

When the solenoid 58 is deenergized to stop the slow forward drive, bar 116 remains in its left hand position and cam 113 holds the brake on pulley 76 in released condition. The restoration of lever 120, however, causes the brake to be applied on pulley 77, which brings the supply spool 31 to a stop. The take up spool 32 is stopped also, by the pull on the wire 30, and its inertia keeps the wire taut, as in the previous case.

The brake operations responsive to the energization of the solenoid 88 for fast forward drive will readily be understood, in view of the preceding explanation. The brake on pulley 77 is released by the cam 114, and the bar 116, if not already in its left hand position, is moved to that position by stud 93 to cause cam 113 to release the brake on pulley 76. When the solenoid 88 is deenergized the brake is applied on pulley 77 while the brake on pulley 76 remains released. The conditions are the same therefore as they are upon the cessation of the slow forward drive and the spools are brought to rest in the same way.

Summing up on the operation of the brakes, when either forward drive or the rewind drive is stopped, the spool to which power was applied is left to run free, except for the wire 30, while the brake is applied on the pulley which is associated with the other spool. The towed spool is always positively brought to rest, therefore, while the previously driven spool is stopped by the wire, which maintains the wire tight between the spools.

The recording head is indicated at 125 and may be of any known and suitable construction. The recording head developed by the Armour Research Foundation has been used with excellent results. This recording head comprises a core structure having two small air gaps, an erase coil associated with one air gap, and a voice coil associated with the other air gap. There is also a small biasing coil connected in series with the erase coil and associated with the voice coil air gap. The core structure with its windings is enclosed in a suitable casing as shown, carrying the pin terminals such as 126, two for the erase and biasing coils and two for the voice coil.

The recording head is supported by a horizontal angle member 130 which is in turn supported on the cross member 23 of the frame by means of the two flexible spring strips 132 and 133. The angle member 130 has an integrally formed depending and generally U-shaped extension 131 on which the recording head 125 is mounted by means of two screws 134 and 135. The core 127 of a neutralizing coil 128 is supported on the front of the recording head by screw 135.

The level wind mechanism includes a shaft 136 which has bearings in the cross members 22 and 23 of the frame and is driven from shaft 36 by the worm 137 and worm gear 138. A heart shaped cam 139 is mounted on shaft 136. A stud 141, rigidly secured to the angle member 130, has a roller 140 which cooperates with the cam 139. In this connection it will be understood that the flexible spring strips 132 and 133 are tensioned to maintain the roller 140 against the cam 139 so that the rotation of the cam is effective to cause a reciprocating motion of the recording head which traverses the wire 30 back and forth on the spools during winding in either direction.

An indicator may be provided comprising the drum 225, mounted on the wheel 226. The wheel 226 has a hub 227 and a short stub shaft 229, by means of which it is rotatably mounted on an L-shaped bracket 228. The bracket is attached to the cross member 22 of the frame. The lower edge of the drum 225 has gear teeth formed therein which cooperate with the worm 230 on shaft 136, so that shaft 136 drives the drum.

The upper part of the drum 225 carries a scale which cooperates with the index or pointer 231. The scale is calibrated in accordance with the amount of wire carried on a full spool. Assuming that the spool 31 carries sufficient wire for one hour's continuous dictation, with enough wire to provide for starting the wire on to spool 32 and to enable the full hour's dictation to be completed without pulling the wire entirely off spool 32, the scale will have sixty divisions corresponding to the sixty minutes in the hour. The gear ratio between the slow speed motor shaft and the drum 225 is such that the drum makes one complete rotation in an hour, if continuously driven. The scale is set to zero when starting off with a fresh spool of wire and as the wire is transferred to spool 32, or rewound temporarily on spool 31, the drum is correspondingly rotated so that the scale always indicates the amount of wire in minutes of dictating time which has been transferred to spool 32.

It will be noted that the drum can be set to zero by merely raising it up far enough so that the gear teeth on the lower edge of the drum are disengaged from the worm 230 and then rotating the drum until the zero point on the scale is opposite the index 231. The scale having been adjusted in this manner, the drum is lowered to normal position to bring the gear teeth into engagement with the worm again.

The frame which has been described, carrying the mechanical parts of the machine, may be mounted on a suitable base or chassis 142, partly shown in Figs. 1 and 3. This base extends beyond the frame at both ends and affords means for mounting various items of electrical equipment such as tubes, transformers, switches, etc. These items will be described with reference to the circuit drawing, Fig. 4. It will be convenient at this time, however, to point out the switching keys A to E, inclusive, and R, which appear on the front of the base, where they can be reached easily for manual operation. Also mounted on the front of the base are the volume control switch 143, the main switch 144, and the conference switch 145. On the back side of the base, Fig. 3, are the jacks 146 and 147, which may be ordinary telephone type jacks, and a common type of connector comprising the multiple pin plug 149 and the socket 148.

The hand microphone assembly 150 is shown in Fig. 5, and includes the microphone 152 and the micro-switches 153 and 154 by means of which the apparatus is controlled when used as a dictating machine. The microphone 152 is mounted on one end of the casing 151 and is of the dynamic type, comprising a permanent magnet and a moving coil connected to the diaphragm. It is accordingly adapted to function either as a transmitter or a receiver. The micro-switches 153 and 154 are self-restoring and are mounted inside the casing 151. Switch 153 is operated by the push button 156, while switch 154 is operated by depressing the leaf spring 155. A multiple-conductor cord connects the assembly 150 with the plug 149.

Figure 4:
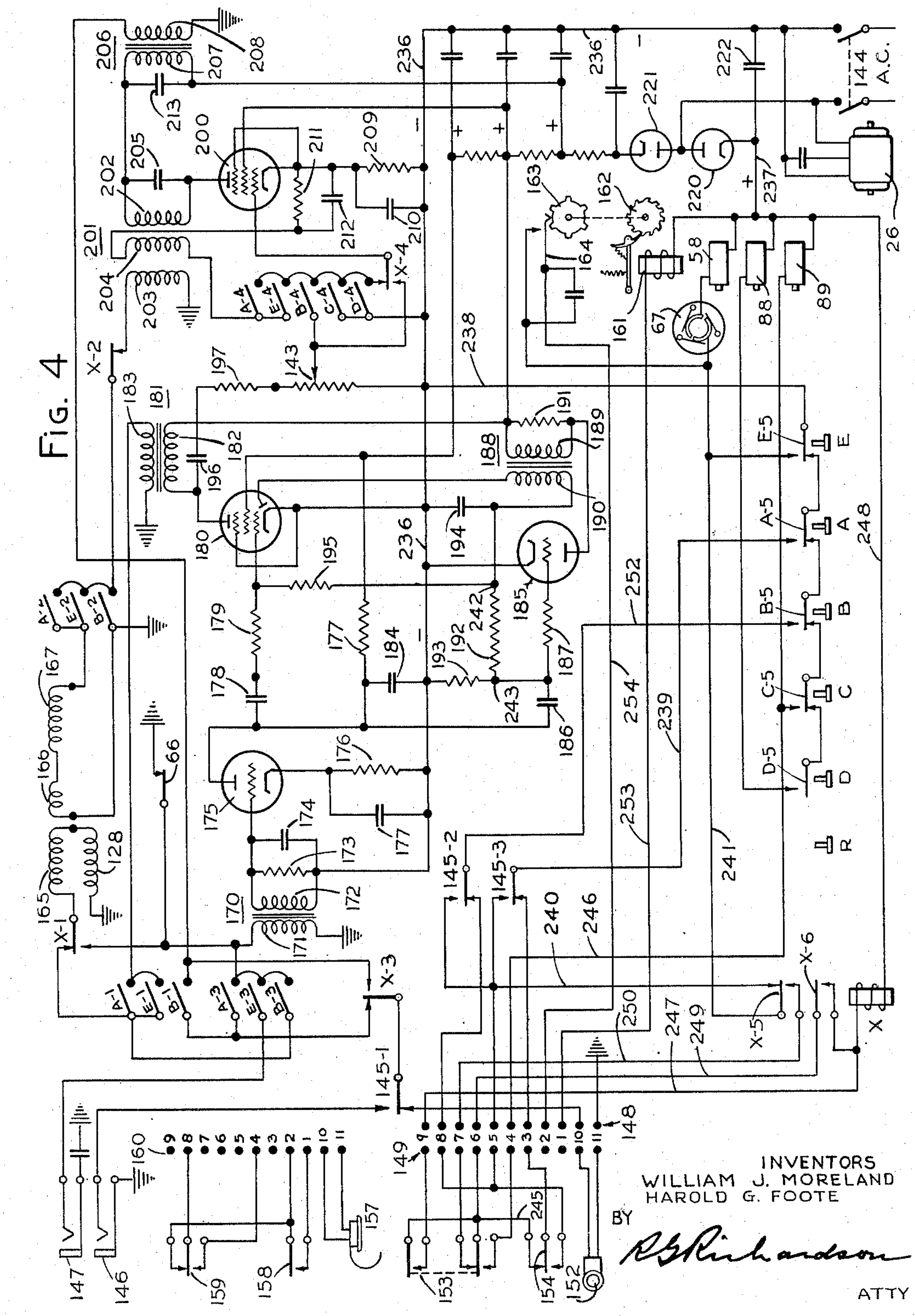
Fig. 4 is a diagrammatic circuit drawing of a complete office dictating and transcribing machine embodying the invention.

Referring now to Fig. 4, the hand microphone 152 is shown at the left, with the micro-switches 153 and 154, and the connections to the plug 149 which is represented by a vertical row of eleven terminals. The socket 148 is represented by a similar vertical row of terminals.

Just above the plug 149 is shown a similar plug 160 which is adapted to be substituted for plug 149 when the machine is used by a transcribing operator. The plug 160 serves to connect the head phone 157 and the micro-switches 158 and 159 to the machine by way of the socket 148. The micro-switches 158 and 159 are mounted in a suitable casing (not shown) which rests on the floor where the switches can be actuated by the foot of the operator.

In the upper left hand corner the jacks 146 and 147 are shown, with their circuit connections.

The key set, comprising the keys A to E, inclusive, and R, is a known type of key set in which the keys, except key R, are of the locking type, and in which each key when actuated unlocks or releases any previously actuated key. Key R is a non-locking release key, adapted to release any of the other keys. For further details reference may be made to Patent No. 2,196,433, granted April 9, 1940.

There is a chain circuit comprising contacts E5, A5, etc., associated with the keys, which is included in the energizing circuits for the solenoids 58, 88, and 89 and makes it impossible to energize two of these solenoids at once by a false operation of the keys. Other contacts on the keys are shown separate therefrom according to known practice in order to simplify the circuit drawing.

Relay X is a switching relay, the function of which will be explained presently. This relay also has contacts which are shown at different points in the drawing convenient to the circuits which they control.

The relay 161 operates a ratchet mechanism including the ratchet wheel 162, which is stepped ahead one tooth at each energization of the relay. The cam 163 rotates with the ratchet wheel and alternately closes and opens the contact 164.

The reference characters 165, 166, and 167 indicate, respectively, the voice coil, the biasing coil, and the erase coil. These coils are in the recording head, as previously mentioned. The neutralizing coil 128 is connected in series with and in opposition to the voice coil. This neutralizing coil is employed because of the close proximity of the recording head to the motor 26, where it is affected by leakage flux from the motor field. Coil 128 is located as nearly as possible in the same position relative to the motor as the voice coil 165, and the voltages developed in the two coils by the leakage flux cancel each other. By properly shielding the recording head or by spacing it farther away from the motor, the coil 128 can be dispensed with.

The amplifier will now be briefly described. It is a combination two and three stage amplifier. All three stages are used during the reproduction or transcribing of a record, but during recording, or dictation, only two stages are used, the third stage being converted to an oscillator for supplying high frequency current to the erase and biasing coils.

The reference character 170 indicates the input transformer, having the primary winding 171 and the secondary winding 172. The secondary winding is shunted by the load resistor 173 and the low capacity bypass condenser 174, and is included in the grid circuit of the tube 175.

The tube 175 may be a type 12SL7 triode and is the first stage of the amplifier. The usual grid biasing resistor is indicated at 176, shunted by the condenser 177. The anode circuit includes the resistor 177.

The tube 180 may be a type 12SF7 diode-pentode and constitutes the second amplifier stage. The control grid of this tube is coupled to the anode circuit of tube 175 by means of the condenser 178 and the resistor 179. Condenser 184 is a low capicity by-pass condenser, similar to condenser 174. The suppressor grid is connected to the cathode while the screen grid is connected to a source of positive potential as shown. The anode circuit of the tube includes the primary winding 182 of the output transformer 181.

The tube 185 may be another type 12SL7 triode and functions as an automatic volume control amplifier. The grid of tube 185 is coupled to the anode circuit of tube 175 through the condenser 186 and resistor 187, in parallel with the control grid of tube 180. The resistor 187 should have a high resistance, preferably about 1 megohm, and is provided in order to limit the flow of grid current in the tube. The anode circuit of tube 185 includes the primary winding 189 of the transformer 188, said winding being shunted by the load resistor 191. The secondary winding 190 of this transformer supplies power to a direct current circuit which includes the resistors 192 and 193 and the diode elements of tube 180. From this circuit negative potentials for automatic volume control are obtained, as will be explained more fully hereinafter. The condenser 194 is a filter condenser, connected across the resistors 192 and 193.

The tube 200 may be a type 35L6 pentode and is adapted to function either as the third stage of the amplifier or as an oscillator. The tube has two grid circuits, an anode circuit, and two output circuits inductively coupled to the anode circuit. The anode circuit includes the primary winding 202 of the oscillator transformer 201 and the primary winding 207 of the amplifier output transformer 206. The winding 202 is shunted by the tuning condenser 205, while the winding 207 is shunted by the high frequency by-pass condenser 213. The secondary winding 208 of transformer 206 is in the amplifier output circuit. The oscillator output circuit includes the secondary winding 203 of transformer 201. The amplifier grid circuit includes a part of the volume control switch or potentiometer 143 and the grid biasing resistor 209, the latter being shunted by the condenser 210. The potentiometer winding 143 is included in an output circuit of tube 180 which includes the condenser 196 and the resistor 197, and constitutes a variable coupling between such output circuit and the amplifier grid circuit. The oscillator grid circuit includes the tertiary winding 204 of the transformer 201 and the resistor 211, shunted by condenser 212.

The amplifier and the various circuits thereof will be described more fully in the course of the detailed explanation of the operation of the machine.

Direct current for operating the relays X and 161 and the solenoids 58, 88 and 89 is supplied by a rectifier which includes the rectifier tube 220 and filter condenser 222. A separate rectifier comprising the tube 221 and the voltage divider and filter condensers as shown is provided for supplying direct current to the tube circuits. The heaters for the tubes (not shown) may be connected in series across the alternating current supply line in parallel with the motor 26. The conductor 236 is a common negative bus or terminal for both rectifiers. The conductor 237 is the positive bus or terminal of the rectifier which comprises tube 220. The other rectifier has three positive terminals on the voltage divider to which the anodes and screen grids of the tubes are connected according to known practice.

The operation of the machine when used as an office dictating machine will now be explained. It may be assumed for this purpose that the supply spool 31 and the take-up spool 32 are in position as shown in Figs. 1 and 2 and that the wire 30 has been started on to spool 32. The indicator 225 should be set to zero. It may be assumed also that the main switch 144 has been closed, so that the motor 26 is running and current is being supplied to the rectifiers and to the heaters in the tubes.

Being ready to start dictating, the operator now actuates the key A, which locks in operated position. At contact A—5, key A prepares a circuit for the slow forward solenoid 58. At contact A—3, key A connects the microphone 152 to the primary winding 171 of the input transformer 170 over a circuit which may be traced from ground by way of connector contact 11, microphone 152, connector contact 10, conference switch contact 145—1, contact X—3, contact A—3, and winding 171 to ground. At contact A—1, key A connects the secondary winding 183 of the output transformer 181 to the voice coil 165 over an obvious path which need not be traced in detail. At contact A—4, key A connects the winding 204 of the oscillator transformer 201 to the control grid of the tube 200, thereby closing the oscillator grid circuit of the tube, and at contact A—2, key A connects the secondary winding 203 of the oscillator transformer 201 in series with the erase coil 167 and the biasing coil 166.

The tube 200 now starts to function as an oscillator, due to the coupling between windings 202 and 204, which are connected in the anode and grid circuits, respectively, of the tube. The oscillator frequency is determined mainly by the inductance of winding 202 and the capacity of the tuning condenser 205 and may be about 25 kilocycles per second. The frequency should be well above the voice frequency range. The condenser 213 has sufficient capacity, about .01 microfarad, to afford an effective high frequency by-pass around the highly inductive winding 207 in the anode circuit. The output of the oscillator is delivered to the erase coil 167 and biasing coil 166 over the above referred to connection established by contact A—2 between these coils and the secondary winding 203.

The operator, who holds the microphone assembly 150, Fig. 5, in one hand, now actuates the micro-switch 154 and holds it in operated position. A circuit for the slow forward solenoid 58 is thus completed which extends from the negative conductor 236 by way of conductor 238, key contacts E—5 and A—5, conductor 239, contact 145—3, connector contact 3, actuated micro-switch 154, connector contact 5, conductor 240, contact X—5, conductor 241, centrifugal switch 67, and winding of solenoid 58 to the positive conductor 237. The solenoid 58 energizes over the above circuit and through the medium of the previously described mechanical arrangement couples the shaft 36 carrying the take-up spool 32 to the slow speed motor shaft 28. The take-up spool 32 starts to rotate and the wire 30 begins to move past the recording head 125. The switch 66 is now open, having been operated by the slow forward mechanism, and the normally existing short circuit has been removed from the primary winding 171 of the input transformer 170.

In moving past the recording head the wire 30 first passes the gap with which the erase coil 167 is associated and since this coil is now being supplied with high frequency current from the oscillator any previously existing record on the wire is wiped out.

Voice currents generated in the microphone 152 in response to dictation are transmitted to the input transformer 170 over the circuit previously described and thence to the first stage amplifier tube 175 where they are amplified in known manner. The voice currents are further amplified at the second stage amplifier tube 180 and the output of this tube is impressed on the voice coil 165 by means of the output transformer 181. Thus the voice currents are recorded on the wire 30 as it passes the gap with which the voice coil is associated. During this operation the biasing coil 166, supplied with high frequency current, functions in known manner.

As previously pointed out, the grid of the automatic volume control tube 185 is coupled to the output circuit of tube 175 in parallel with the control grid of the amplifier tube 180 and in consequence the voice frequency voltages impressed on the grid of the latter tube are also impressed on the grid of tube 185. During dictation, therefore, the voice currents are amplified by tube 185 and alternating voltages are generated in the secondary winding 190 of transformer 188. This winding is included in the previously referred to direct current circuit which includes also the resistors 192 and 193 and the diode elements of tube 180, and accordingly a pulsating direct current is caused to flow in this circuit, producing potentials at points 242 and 243 which are negative with respect to the potential on conductor 236 to which the cathodes of tubes 180 and 185 are connected. These negatives potentials are smoothed out by the filter condenser 194 and are proportional to the value of the current flow in the direct current circuit which in turn is proportional to the amplitude of the incoming voice frequency signals.

The point 242 is connected through the resistor 195 to the control grid of tube 180 and the negative potential thus impressed on this grid in response to incoming signals causes the sensitivity of the tube to vary inversely with the amplitude of the signals, whereby the tube tends to maintain a substantially constant output. The regulating effect is enhanced by the connection of point 243 to the grid of tube 185, whereby incoming signals cause a negative biasing voltage to be placed on the grid of this tube also. With this arrangement the tube 180 can be somewhat overcompensated and the drooping output characteristics of the tube which would otherwise result is corrected by the controlled output of tube 185. The desired result is obtained by proper proportioning of the circuit constants, particularly the values of the resistors 192 and 193, which function as a voltage divider. The resistor 192 may have a resistance of about 5.6 megohms and in this case the resistor 193 should have a resistance of about 1 megohm, whereby the biasing potential applied to the grid of tube 185 in response to a given input signal will be about one-seventh the biasing potential applied to the grid of tube 180.

The condensers 174 and 184 which may have a capacity of about 100 micro-microfarads, are provided to bypass any high frequency currents that may be present in the input circuit of tube 175 due to stray coupling with the oscillator circuits. Such high frequency currents, amplified by tube 175, might affect the operation of the automatic volume control circuit.

The operator will probably have to stop dictating from time to time and at such times he will release the micro-switch 154, thereby deenergizing the slow forward solenoid 58 and uncoupling the take up spool 32. This stops the movement of the wire 30 from spool 31 to spool 32 and avoids wasting the wire. The movement of the wire can be instantly started again by again actuating the micro-switch.

In case dictation is stopped for any reason which distracts the attention of the operator, he will wish to reproduce the last part of the record before resuming dictation, to insure proper continuity of the recorded subject matter. Reproduction of a desired part of the record involves first rewinding the section of the wire on which the matter to be reproduced is recorded, then resuming the slow forward movement of the wire, and switching the circuits from recording to reproducing condition. These operations are controlled with great facility by means of the micro-switches associated with the hand microphone.

The micro-switch 154 being in normal or released position, the operator actuates the micro-switch 153 and thereby completes a circuit for the rewind solenoid 89 which can be traced from the negative conductor 236 by way of conductor 238, key contacts E—5 and A—5, conductor 239, contact 145—3, connector contacts 3, normally closed contact of micro-switch 154, conductor 245, lower make contact of micro-switch 153, connector contact 4, conductor 246, and winding of the rewind solenoid 89 to the positive conductor 237. Upon energizing, solenoid 89 couples the shaft 40 carrying the supply spool 31 to the high speed shaft 27 of the motor by means of belt 79 as previously described. The supply spool accordingly begins to rotate at high speed to rewind the wire from the take up spool 32.

A branch of the above described circuit of solenoid 89 extends from conductor 245 by way of the upper make contact of micro-switch 153, connector contact 9, conductor 247, winding of relay X, and conductor 248 to the positive conductor 237. Relay X accordingly energizes at the same time that solenoid 89 is energized and closes a locking circuit for itself at contact X—6. This locking circuit includes connector contact 6 and conductor 249.

In addition to the foregoing, relay X prepares a circuit for the slow forward solenoid 58 at contact X—5 and at other contacts performs switching operations whereby the machine is placed in condition for reproducing the record as soon as the slow forward motion of the wire is resumed. At contact X—1 the voice coil 165 is disconnected from the secondary winding 183 of the output transformer 181 and is connected to the primary winding 171 of the input transformer 170. At contact X—3 the microphone 152 is disconnected from the primary winding 171 of the input transformer 170 and is connected to the secondary winding 208 of the amplifier output transformer 206. At contact X—4 the control grid of tube 200 is disconnected from winding 204 of the oscillator transformer 201 and is connected to the output circuit of tube 180 at the volume control switch 143. This latter operation converts tube 200 from an oscillator to an amplifier. Although the generation of high frequency current ceases, the primary winding 202 remains in the anode circuit of tube 200 and it is necessary therefore to open the oscillator output circuit, which is accomplished at contact X—2.

The operator will ordinarily hold the micro-switch 153 in operated position for only a few seconds, since the high speed rewinding operation very quickly rewinds enough wire so that by reproducing the speech recorded thereon the operator will be able to recall where he left off and resume dictation. When the micro-switch 153 is released, the initial energizing circuit of relay X is broken, but the relay remains energized over its locking circuit. The release of the micro-switch opens the circuit of the rewind solenoid 89 and prepares a circuit for the slow forward solenoid 58, the latter circuit extending from the negative conductor 238 by way of the previously traced path to conductor 245 and thence by way of the normally closed micro-switch contact, connector contact 7, conductor 250, contact X—5, conductor 241, centrifugal switch 67, and winding of solenoid 58 to the positive conductor 237. The rewind solenoid 89 deenergizes when its circuit is broken, the supply spool 31 is uncoupled from the motor, and the spools are quickly brought to rest by the braking mechanism in the manner previously described.

During the rewinding operation the centrifugal switch opens the circuit of the slow forward solenoid 58, the rewinding speed being many times faster than the slow forward speed. As the spools are slowed down by the braking mechanism after the deenergization of solenoid 89 the centrifugal switch closes shortly before the speed becomes equal to the slow forward speed, thereby completing the prepared circuit for the slow forward solenoid 58. Upon energizing, solenoid 58 couples the take up spool to the motor and the slow forward drive is resumed. By this time the spools will have been brought to rest by the braking mechanism, or very nearly so. The delay in the closure of the circuit for the slow forward solenoid which is introduced by the centrifugal switch eliminates the danger of breaking the wire which could be present if the slow forward drive were to be started immediately after stopping the high speed rewind drive.

The wire 30 is now moved past the recording head at slow forward speed as before. With the circuits in their present condition, however, relay X energized, the machine functions as a reproducer rather than as a recorder. As the wire passes the air gap associated with the voice coil 165, voice currents are generated in the coil and are transmitted to the input transformer 170 of the amplifier. The voice currents are amplified at the first and second stage amplifier tubes 175 and 180 in the usual manner, and are further amplified at tube 200, now functioning as a third amplifier stage. The secondary winding of the output transformer 206 being now connected to the microphone 152 the amplified voice currents operate the microphone as a receiver to reproduce the speech recorded on the wire.

It is to be noted that the automatic volume control circuit associated with the second stage amplifier tube 180 is in operation during the reproducing operation as well as during the recording operation. In a manner of speaking, therefore, this circuit arrangement gets a second shot at any irregularities that there may have been in the volume of the speech that was recorded and is able to maintain the volume of the reproduced speech at a remarkably constant level. The value of this constant level depends on the setting of the volume control switch 143, which can be adjusted to give any desired output volume.

The operator listens to the reproduction of his dictation and when the end is reached he actuates the micro-switch 154 again and can immediately resume his dictation. The operation of the micro-switch breaks the locking circuit of relay X and also breaks the circuit of the slow forward solenoid 58. The relay X accordingly deenergizes and reconverts the machine to a recorder. The slow forward solenoid deenergizes momentarily but its original energizing circuit is immediately completed at the make contact of the micro-switch, so that the slow forward drive is continued with no appreciable interruption. If the operator desires to merely stop the machine after the recorded matter has been reproduced he will actuate the micro-switch 154 only momentarily, which will unlock the relay X and open the circuit of the solenoid 58 as above described. The circuit of the solenoid 58 is not again closed upon the release of the micro-switch because relay X, upon deenergizing, opens the circuit at contact X—5. This leaves the machine ready to start recording again whenever the operator actuates the micro-switch 154.

In case the operator should make a mistake in his dictation and wish to correct the same, he will immediately release the micro-switch 154 to stop the slow forward drive and will then actuate the micro-switch 153 to rewind a short section of the wire, enough to insure rewinding that part of the wire which contains the record to be changed. Upon the release of the micro-switch 153, the machine starts in the slow forward direction again and reproduces the recorded speech as previously explained. Listening to the reproduction, the operator recalls what he said and notes the approach of the phrase or sentence to be corrected. He then actuates the micro-switch 154, whereupon the machine is changed back to a recording machine, and as the slow forward movement of the wire continues the record thereon is erased. The operator then takes up the dictation at the point where the reproduction left off, repeating the last few words if desired, although this is not necessary.

As mentioned hereinbefore, it may be assumed that a full spool carries enough wire for one hour or sixty minutes of dictation. The indicator drum 225 is calibrated accordingly, and the operator may, if he desires, read the indicator before starting each letter and note the readings on a slip of paper or card opposite brief titles, such as Smith, Jones Co., etc. which identify the letters.

The operator will also observe the indicator from time to time so as to note the approaching exhaustion of the wire on the supply wool 31 and when the indicator shows that sixty minutes' dictating time has elapsed he will stop the machine. The wire may be long enough to allow some overrun, so that it will not be necessary to stop in the middle of a paragraph, or letter of reasonable length.

The wire remaining on the supply spool may now be transferred to the take up spool by means of the slow forward drive. This is rather slow, however, and will waste time, especially if the dictation has stopped short of the full sixty minutes for which the wire provides. The operator will prefer to use the fast forward drive, therefore, for this purpose, and will put aside the hand microphone assembly and operate the key D. The operation of this key releases key A and closes an obvious circuit for the fast forward solenoid 88. Upon energizing, solenoid 88 couples the shaft 36 carrying the take up spool 32 to the high speed motor shaft 27, by means of belt 78, and the spool 32 is rotated at high speed to quickly complete the transfer of the wire from spool 31. The end of the wire, as it arrives at spool 32, is secured by the leader in the manner previously explained. The operator now stops the fast forward drive by releasing key D, completes the winding of the leader on spool 32 if necessary, and removes the spool from the machine. This spool may now be passed along to the transcribing operator, with the slip of paper or card on which the location of the various letters was noted.

The empty spool 31 is now transferred from hub 39 on shaft 40 to hub 35 on shaft 36 and becomes the take up spool. A fresh supply spool may then be placed on hub 39 and after the end of the wire has been started on to the take up spool the machine is ready for further dictation.

The individual in whose office the dictating machine is installed, referred to herein as the "operator," may occasionally desire to record a telephone conversation in which he is engaged with some outside party. The machine is adapted for this service, as will now be explained briefly.

It will be understood that a tap to the operator's telephone line has to be provided, terminating in a plug which may be inserted in the jack 147. This plug may be left in the jack. The main switch 144 should be closed also, whenever it is possible to anticipate the need for the service, as otherwise the necessity for warming up the tubes may cause part of a conversation to be lost.

Assuming that a telephone conversation is about to begin and that the operator desires to make a record of it, he will actuate the key E. The key locks in operated position and at contact E—5 completes an obvious circuit for the slow forward solenoid 58. Upon energizing, the solenoid 58 starts the slow forward drive in the manner previously explained. At contact E—3 the key connects the primary winding 171 of the input transformer 170 to the telephone line by way of jack 147. At contacts E—1, E—2, and E—4 the key completes other circuits by means of which the machine is placed in condition for recording. These circuits are the same as previously described circuits which are completed by key A when the machine is in use for recording dictation and need not be described again. The operation of recording is also the same, except that the voice currents to be recorded now come from the telephone line via jack 147 instead of from the microphone 152.

When the telephone conversation is over with the operator will stop the machine by operating the release key R to release the key E, or by operating key A which releases key E and at the same time places the machine in condition for recording dictation. The operator can immediately reproduce the conversation if he desires to do so, by operating the micro-switch 153 to rewind the wire and then releasing the switch to start the reproduction, all as previously explained. Later on the recorded conversation may be transcribed along with other recorded material on the wire.

The machine is also adapted for use in recording a conference, and for this purpose a dynamic type of loud speaker is preferably provided adapted to pick up conversation from any part of the conference room and to reproduce the recorded speech with sufficient volume so that it can be heard all over the room. It will be understood that the hand microphone 152 is not well adapted for this purpose. The hand microphone assembly including the micro-switches 153 and 154 is not used, therefore, although if the conference is held in the office where the machine is installed the plug 149 may be left in the socket 148 without interfering with the operation of the machine.

The loud speaker is connected with the machine by means of a plug inserted in the jack 146. If not already done a full supply spool should also be placed in position and started on to the take up spool. When the people are assembled and the conference is about to begin, the main switch 144 is actuated, also the conference switch 145 and the key A. At contact A—5 key A closes a circuit for the slow forward solenoid 58 which extends from the negative conductor 236 by way of conductor 238, key contacts E—5 and A—5, conductor 239, conference switch contact 145—3, conductor 240, contact X—5, conductor 241, centrifugal switch 67, and winding of the slow forward solenoid 58 to the positive conductor 237. The slow forward solenoid accordingly energizes and starts the slow forward drive. At contact A—3, the key A connects the loud speaker with the primary winding of the input transformer 170 over a path which includes the jack 146, the conference switch contact 145—1, contact X—3, and contact A—3. At other contacts key A completes the conditioning of the machine for recording, all as previously explained.

The machine may be allowed to run continuously during the conference and whatever discussion takes place will be picked up by the loud speaker and recorded on the wire. At some point in the discussion a question may arise as to what was previously said by some one of the people present, making it desirable to reproduce the record. This is accomplished by first operating key C to rewind the wire, only enough need be rewound to include the statement to be verified, and by then operating key B to reproduce the record on the wire that has been rewound.

Explaining these operations more in detail, the actuation of key C releases key A and the release of this key deenergizes solenoid 58 and stops the slow forward drive. Key C also closes a circuit for the rewind solenoid 89, which functions as previously described to start the rewind drive. After sufficient wire has been rewound, key B is operated, releasing key C and stopping the rewind drive.

Key B closes a circuit for the slow forward solenoid which may be traced from the negative conductor 236 by way of conductor 238, key contacts E—5, A—5, and B—5, conductor 252, conference switch contact 145—2, conductor 240, contact X—5, conductor 241, switch 67, and winding of solenoid 58 to the positive conductor 237. Upon energizing, solenoid 58 starts the slow forward drive in the usual manner. At contact B—3, key B connects the voice coil 165 to the primary winding 171 of the input transformer 170. At contact B—4 the control grid of tube 200 is connected to the output circuit of tube 180, and at contact B—2 a short circuit is placed on the secondary winding 203 of the oscillator transformer 201. Finally, at contact B—1, the secondary winding 208 of the output transformer 206 is connected to the loud speaker, this latter connection including the conference switch contact 145—1. These switching operations cause the machine to function as a reproducing machine, utilizing the loud speaker to repeat the previous discussion, or so much of it as is recorded on the section of wire that was rewound, to the members of the conference. When the reproduction is finished, key A is operated, releasing key B, and converting the machine back to a recording machine again, ready to record the comments on the previous discussion and any further discussion that may ensue.

At the start of the reproduction of the conference discussion as above described the volume control switch 143 is adjusted so that the volume is sufficient to enable the reproduction to be heard in all parts of the room. The automatic volume control is in operation both during recording and reproducing and is particularly useful and effective in this case, that is, when the machine is employed for conference service. Words spoken directly into the loud speakers and words spoken across the room, or twenty or thirty feet away, are reproduced with substantially equal volume. There is, moreover, an almost instantaneous response, which makes it possible for persons close to and far away from the loud speaker to talk in quick succession without impairing the uniform level of the reproduced conversation.

When the conference is over the wire remaining on the supply spool is quickly wound on to the take up spool by utilization of the fast forward key D and the latter spool is taken off the machine and handed over to the transcribing operator or typist for preparation of a typewritten transcription.

The foregoing completes the explanation of the dictating and analogous recording operations. The operations performed by the transcribing operator will now be explained.

The machine used by the transcribing operator may be the same as the machine used for dictation, except that the hand microphone assembly 150 is not supplied but is replaced by the head phone 157 and the foot switches 158 and 159. It may be assumed therefore that the identical machine which has been described hereinbefore is now a transcribing machine and that the plug 160 in which the cords from the head phone and the foot switch assembly are terminated is inserted in the socket 148.

When a spool of record bearing wire is received by the transcribing operator she will place the same on hub 35, where it retains its identity as the take up spool. An empty spool is then placed on the hub 39 and becomes the supply spool. The end of the wire is then started on to the supply spool by means of the attached leader, as previously explained, and the wire between the spools is properly adjusted on the recording head. Assuming that the main switch 144 is closed, the operator will note the position of the indicator drum 225 and set it to zero if it is not in that position already, and will then operate the rewind key C, which locks in operated position. Key C closes the circuit of the rewind solenoid 89, which starts the rewind drive whereby the supply spool is rotated at high speed to transfer the wire from the take up spool. During this operation the operator will observe the indicator drum 225 and will release key C to stop the rewinding operation as soon as the pointer again reads zero on the scale, the drum having made one complete rotation. This leaves the wire attached to the take up spool, although the entire record bearing portion of it has been transferred to the supply spool.

Having adjusted the head phone 157 if necessary, and seen to it that the foot switch assembly is in convenient position, the operator will actuate the key B, which locks in operated position and places the machine under control of the foot switches. Key B also closes various circuits which condition the machine for operation as a reproducing machine.

The operator may now momentarily depress the switch 158 which momentarily closes a circuit for relay 161, said circuit extending from the negative conductor 236 by way of conductor 238, key contacts E—5, A—5, and B—5, conductor 252, conference switch 145—2, connector contact 8, normally closed contact of switch 159, switch 158, connector contact 1, conductor 253, and winding of relay 161 to the positive conductor 237. Upon energizing, relay 161 advances the ratchet wheel 162 one step and on deenergizing prepares to advance it another step when again energized. The cam 163 rotates with ratchet wheel 162 and at contact 164 closes a circuit for the slow forward solenoid 58 which may be traced as a branch of the previously traced circuit from switch 158 by way of connector contact 2, conductor 254, contact 164, centrifugal switch 67, and winding of the solenoid 58 to the positive conductor 237. Upon energizing, the solenoid 58 starts the slow forward drive in the usual manner. It will be noted that contact 164 remains closed and the machine continues to run independently of the foot switch 158 which was only momentarily operated.

The key B being in operated position the machine now operates as a reproducing machine and the speech recorded on the wire is reproduced in the head phone 157, where it is heard by the operator. In this connection it will be noted that the head phone has been substituted for the microphone 152 and is connected to the secondary winding 208 of the output transformer 206 over a circuit previously traced.

The operator writes the letter or other recorded material on her typewriter as it comes in at her head phone. If she should get behind she can stop the machine by momentarily operating the foot switch 158 again, which operates the relay 161 again and advance the ratchet wheel 162 and cam 163 another step. This opens contact 164 and deenergizes the solenoid 58. When the operator has caught up with the machine, she can start it again by another momentary operation of the foot switch 158.

In the event that the operator's attention should be diverted, causing her to forget some phrase before it can be written out, or if she should be uncertain of some passage, she will want to repeat the reproduction of such phrase or passage. This is accomplished by depressing the foot switch 159.

The operation of switch 159 breaks the circuit of solenoid 58 if this circuit is closed at contact 164 at the time the switch is operated. This stops the slow forward drive. Switch 159 also closes a circuit for the rewind solenoid 89 extending from the negative conductor 236 by way of conductor 238, key contacts E—5, A—5, and B—5, conductor 252, connector contact 8, switch 159, connector contact 4, conductor 246, and winding of solenoid 89 to the positive conductor 237. Upon energizing, solenoid 89 starts the rewind drive in the usual manner. The operator holds the switch 159 depressed only for an instant, or long enough to rewind that part of the wire which contains the record of the words which she desires to have repeated, and then releases it. The release of the switch deenergizes the rewind solenoid 89 and stops the rewind drive, also again closes the circuit of the slow forward solenoid 58, if the circuit was closed at the time the switch was operated. In this event the solenoid 58 is immediately energized again and the slow forward drive is resumed. Otherwise the slow forward drive is started by momentary operation of foot switch 158 when the operator is ready to proceed.

It will be seen that the foot switch arrangement enables the operator to manipulate the wire with great facility. The forward drive and reproduction of the record can be started and stopped as desired, by momentary operations of switch 158. The switch does not have to be held down, which enables the operator to give her undivided attention to typing the recorded material as it is reproduced. The arrangement of switch 159, which requires it to be held operated during rewinding, is likewise well adapted to the function it has to perform. During rewinding the operator's attention is occupied solely with this operation and since the operation is stopped by simply releasing the switch she is able to accurately control the duration of the operation in accordance with the amount of wire to be rewound each time.

Ordinarily the operator will transcribe the material recorded on the wire in the order in which it was dictated. The fact that the wire may contain a full hour's dictation, however, may make it necessary for her to depart from this practice and transcribe the several parts of the record in a different order. As an extreme case, the last letter recorded on the wire may be wanted first. This could happen, for example, when a spool is filled toward the end of the day when there is not sufficient time to transcribe the entire spool of wire, and so far as most of the material is concerned there is no need to do it, but it is necessary that the letter last dictated be transcribed and mailed that day.

In such a case the operator will make use of the fast forward drive to quickly bring the desired letter into position for reproduction. After noting the location of the desired letter on the wire, as shown by the indicator slip accompanying the spool, the operator will operate the key D which locks and closes the circuit of the fast forward solenoid 88. Solenoid 88 energizes and initiates the fast forward drive. The operator now watches the indicator drum 225 and stops the fast forward drive by releasing key D when the pointer 231 which is associated with the scale on the drum indicates that the record of the desired letter has been reached. Key D may be released by operating key B, which places the machine in condition for reproduction. The exact beginning of the letter can then be located readily by starting the slow forward drive and listening to the reproduction, rewinding some of the wire if necessary.

In connection with the foregoing it may be pointed out that if contact 164 on relay 161 is closed at the time key B is operated the energization of the slow forward solenoid 58 will nevertheless be delayed by the centrifugal switch 67 until the rotational speed of the spools has slowed down nearly to the slow forward speed. This prevents the abrupt reduction in the speed of the take up spool and overrun by the supply spool which would otherwise occur.

It will be noted that during the rewind and fast forward drives the control grid of tube is connected to the negative conductor 236 by key contact C—4 or D—4, as the case may be. This may not be strictly necessary but is believed to be desirable in order to prevent incipient oscillations which might damage the record because of capacitive coupling between the oscillator circuit conductors and conductors extending to the voice and erase coils.

While a certain specific embodiment of the invention has been disclosed herein, it will be understood that this has been done to facilitate the explanation and that the invention is not limited to the exact form thereof which is illustrated and described herein. For example, it will be understood that the sound record wire may be replaced by a tape or other medium and that where a wire is referred to in the claims this term should be taken to mean any suitable sound record medium.

The invention having been described, that which is believed to be new, and for which the protection of Letters Patent is desired will be pointed out in the appended claims.

We claim:

1. In a sound recording and reproducing apparatus, a supply spool, a take up spool, a wire for receiving a sound record, means for supplying power to either spool to wind said wire thereon and unwind it from the other spool, individual brakes for said spools, means including a longitudinally movable bar for controlling the supply of power to said spools, a second longitudinally movable bar operated by said first bar, and means whereby said bars control the application and release of said brakes.

2. In a sound recording and reproducing apparatus, a supply spool containing wire on which sound may be recorded, a take up spool, a motor having high and low speed output shafts, a clutch mechanism for coupling said low speed shaft to said take up spool to transfer said wire thereto during recording, clutch mechanism for coupling said high speed shaft to said supply spool to rewind the wire, clutch mechanism for coupling said high speed shaft to said take up spool to transfer a desired portion of said wire thereto at high speed, three electromagnets for operating said three clutch mechanisms, respectively, means for selectively energizing said electromagnets, and brake mechanism for said spools operated by said electro-magnets.

3. In an office dictating and transcribing machine, a sound record medium comprising a wire, a recording head, slow and fast drives for moving said wire past said recording head, means for starting and stopping the fast drive at will, and means for starting the slow drive only if the wire is stationary or is moving at a speed which is lower than said fast speed by a predetermined amount, said slow drive starting means including a centrifugal switch having a switch element rotated at a speed which is proportional to the wire speed.

4. In a sound recording and reproducing machine, two spools for reeling wire on which sound may be recorded, forward winding means for transferring wire from the first of said spools to the second of said spools, rewinding means for transferring wire from the second spool back to the first spool, means including a manually operable switch for starting and stopping said forward winding means, recording means operative during the operation of said forward winding means, means including a second manually operable switch for operating said rewinding means, said second switch including means for restoring it when released from manual control, means responsive to the release and restoration of said second switch for reoperating said forward winding means, reproducing means, and means controlled by said second switch for automatically operating said reproducing means during reoperation of said forward winding means.

5. In a sound recording and reproducing machine, two spools for reeling wire on which sound may be recorded, forward winding means for transferring wire from the first of said spools to the second of said spools, rewinding means for transferring wire from the second spool back to the first spool, a manually operable control device for operating said forward winding means, a second manually operable control device of self-restoring type for operating said rewinding means and said forward winding means successively responsive to operation and release of said device, respectively, recording means operative during operation of said forward winding means by said first device, reproducing means, and means controlled jointly by said first and second devices for rendering said reproducing means operative during operation of said forward winding means by said second device.

6. In a sound recording and reproducing machine, two spools for reeling wire on which sound may be recorded, forward winding means for transferring wire from the first spool to the second spool, rewinding means for transferring wire from the second spool to the first spool, a manually operable self-restoring switch for operating said rewinding means, means responsive to the release of said switch for operating said forward winding means, reproducing means operated during operation of said forward winding means, a second manually operated switch for operating said forward winding means, recording means, and means responsive to the actuation of said second switch for rendering said reproducing means inoperative and said recording means operative.

7. A sound recording and reproducing machine as claimed in claim 6, wherein the means for rendering the reproducing means inoperative and the recording means operative comprises a relay having an energizing circuit controlled by said first switch and a locking circuit controlled by said second switch.

8. In a sound recording and reproducing machine, a supply spool containing wire on which sound may be recorded, a take up spool, forward winding means for transferring wire from said supply spool to said take up spool, rewinding means, recording means, reproducing means, a set of manually operable keys including mechanism responsive to the actuation of any key for restoring any previously actuated key, circuits controlled by a first one of said keys for connecting said recording means for operation, circuits controlled by a second key for operating said rewinding means, circuits controlled by a third key for operating said forward winding means and said reproducing means, a manually operated switch, and a circuit completed jointly by said switch and said first key for operating said forward winding means, said last mentioned circuit including contacts of said switch and said first key connected in series.

9. In a sound on wire machine, a sound record wire, a voice coil, forward and rewind driving means for moving said wire past said voice coil, an amplifier connected to said voice coil during both forward and rewind drive, a normally closed circuit by which said amplifier is made nonresponsive to currents generated in said voice coil, means including a mechanical clutch mechanism for operating said forward drive, and a switch actuated by a part of said clutch mechanism for opening said circuit.

10. In a transcribing machine, a wire having sound recorded thereon, a reproducing head, electro-magnetic driving means for moving said wire past said head, a circuit for said driving means, an operator's switch, and a unidirectional rotary switch responsive to each actuation of said operator's switch to close said circuit if it is open and to open said circuit if it is closed.

11. In a transcribing machine, a wire having sound recorded thereon, a reproducing head, driving means for moving said wire past said head, means including an operator's switch for starting said driving means, means for continuing the operation of said driving means independently of said switch, rewinding means and means including a second operator's switch for stopping said driving means and starting said rewinding means.

12. In a sound recording and reproducing apparatus, a supply spool, a take up spool, a wire for receiving a sound record, means for supplying power to either spool to wind said wire thereon and unwind it from the other spool, individual brakes for said spools, means independent of the tension in said wire for applying said brakes, two independently operable devices associated with each brake for releasing the same, and means responsive to the initiation and interruption of power supply to either spool to selectively operate said devices.

13. In a sound recording and reproducing apparatus, a supply spool, a take up spool, a wire for receiving a sound record, means for supplying power to either spool to wind said wire thereon and unwind it from the other spool, individual brakes for said spools, means for applying said brakes, a pair of independently operable devices associated with each brake for releasing the same, means responsive to the initiation of power supply to one spool for operating one device of each said pair, and means responsive to the initiation of power supply to the other spool for operating the other device of each said pair.

14. In a sound recording and reproducing apparatus, a supply spool, a take up spool, a wire for receiving a sound record, means for supplying power to either spool to wind said wire thereon and unwind it from the other spool, individual brakes for said spools, means for applying said brakes, a device which is moved responsive to the application of power to one spool for releasing the brake on the other spool, a second device operated by said first device to release the brake on the spool to which power is applied, and a lost motion connection between said devices whereby upon the restoration of said first device to its original position the second device remains operated.

15. In a sound recording and reproducing apparatus, a supply spool, a take up spool, a wire for receiving a sound record, means for supplying power to either spool to wind said wire thereon and unwind it from the other spool, individual brakes for said spools, means for applying said brakes, a two position device which is operated from first to second position and restored to first position responsive to the initiation and interruption, respectively, of power supply to either spool, a second device which operates responsive to the operation of said first device but not upon the restoration thereof, and means whereby said devices jointly effect the release of said brakes.

16. In a sound recording and reproducing apparatus, a motor having oppositely disposed high and low speed out put shafts, take up and supply spool shafts extending parallel to said motor shafts, two belts for coupling said take up and supply spool shafts, respectively, to the high speed motor shaft, said belts being normally loose, means for selectively placing said belts under tension to drive either the supply spool or take up spool at high speed, and means for coupling the take up spool shaft to said low speed motor shaft to drive the take up spool at low speed.

17. In a sound on wire apparatus, a supply spool, a take up spool, a motor having high and low speed output shafts, two coupling devices for connecting said take up spool to said shafts, respectively, two selectively energizable electro-magnets for operating said coupling devices, respecitvely, individual brakes for said spools, and mechanism actuated by said electro-magnets for controlling the application and release of said brakes.

18. In a sound on wire apparatus, a supply spool, a take up spool, a wire adapted to carry a sound record, a motor, selectively operable coupling devices for coupling said motor to either spool to wind said wire thereon and unwind it from the other spool; electro-magnets for actuating said coupling devices, individual brakes for said spools, each brake comprising means for applying a constant predetermined retarding force to the associated spool and mechanism also actuated by said electro-magnets for controlling the application and release of said brakes.

19. In a sound on wire apparatus, a supply spool, a take up spool, a wire adapted to carry a sound record, a motor, two coupling devices for coupling said motor to either spool to wind said wire thereon and unwind it from the other spool, two selectively energizable electro-magnets for actuating said coupling devices, respectively, individual brakes for said spools, means for applying said brakes, a brake releasing device responsive to the energization and to the deenergization of each said electro-magnet, and a supplementary brake releasing device responsive to the energization of each electro-magnet but not to the deenergization thereof.

20. In an office dictating machine, a sound record medium, a recording head, a forward drive for moving said medium past said head during dictation, a rewind drive, means for starting and stopping said rewind drive, and means responsive to the decrease in the speed of the rewind drive each time it is stopped for automatically starting said forward drive, said last means including a circuit for operating the forward drive, and a centrifugal switch for closing said circuit.

21. In a transcribing machine, a wire having sound recorded thereon, a reproducing head, driving means for moving said wire past said head to reproduce said sound, a circuit for said driving means, an operator's switch, means responsive to a momentary actuation of said switch for closing said circuit and maintaining it closed after the switch is restored, rewinding means, a circuit for operating said rewinding means, and a second operator's switch having a normally closed contact in said first circuit and a normally open contact in said second circuit.

22. In a transcribing machine, a wire having sound recorded thereon, a reproducing head, driving means for moving said wire past said head to reproduce said sound, a circuit for said driving means, an operator's switch, means responsive to a momentary actuation of said switch for closing said circuit and maintaining it closed after the switch is restored, a second operator's switch including means for opening said circuit upon each actuation thereof, means for rewinding said wire, an operating circuit for said rewinding means, and means in said switch for closing said operating circuit upon each actuation of the switch.

23. In an office dictating machine, a wire on which sound may be recorded, a recording head, a forward drive for moving said wire past said recording head, mechanism for starting and stopping said forward drive, recording circuits operative during said forward drive, a rewind drive, an operator's switch for starting and stopping said rewind drive, reproducing circuits, a relay energized responsive to the actuation of said switch to open said recording circuits and close said reproducing circuits upon initiation of the rewind drive, means independent of said switch for maintaining said relay energized when the switch is restored to stop the rewind drive, means including said relay for actuating said mechanism to start the forward drive responsive to restoration of said switch, and means for rendering said reproducing circuits inoperative during said rewind drive, said means including a switch controlled by said mechanism.

24. In a sound recording and reproducing machine, a sound record medium, a recording and reproducing head, an electromagnet, a forward drive mechanism including means for moving said medium past said head responsive to the energization of said electromagnet, a circuit connected to said electromagnet for energizing the same, a switch having normally open contacts in said circuit which prepare the circuit when the switch is actuated, an operator's switch of the self-restoring type having normally open contacts in said circuit which complete the circuit when the switch is operated, said first switch being in operated position at the time, and a conference switch adapted for operation when said first mentioned switches are not operated, said conference switch having contacts which prepare a second circuit for said electromagnet over a path which includes the first switch but excludes the operator's switch, whereby the operation of said first switch while the conference switch is in operated position will energize said electromagnet over said second circuit.

25. In an office dictating machine, means including electrical circuits for recording sound on a sound record medium, a switch having normally open contacts which are closed by operation of the switch to complete said circuits, means including electrical circuits for reproducing the sound recorded on said medium, a second switch having normally open contacts which are closed by operation of the second switch to complete said reproducing circuits, a relay adapted to be energized when said first switch is in operated position and having switching contacts for opening said recording circuits and closing said reproducing circuits, a circuit for energizing said relay including contacts of said first switch, and a third switch having contacts for completing said energizing circuit.

26. A machine as claimed in claim 25, wherein the third switch is portable and is connected with the machine by a flexible multiconductor cord.

27. In an office dictating machine, a recording head, a forward drive for moving a sound record medium past said head during dictation, a rewind drive, a switch, means responsive to the operation and restoration of said switch, respectively, for starting and stopping said rewind drive, means including a normally open circuit for operating said forward drive, a relay energized responsive to the operation of said switch, a normally open contact in said circuit closed by energization of said relay, whereby said circuit is prepared when the rewind drive is started, and contacts in said switch which are closed to complete said circuit when the switch is restored to stop said rewind drive.

28. In an office dictating machine, a recording head, a forward drive for moving a sound record medium past said head during dictation, a rewind drive, a switch having a normal position and an operated position, means responsive to operation of said switch for starting said rewind drive and for stopping the rewind drive responsive to restoration of the switch to its normal position, a relay energized responsive to operation of said switch, means for maintaining said relay energized after said switch is restored, and a circuit for operating said forward drive including contacts closed by energization of said relay and contacts closed by restoration of said switch.

WILLIAM J. MORELAND.
HAROLD G. FOOTE.

REFERENCES CITED

The following references are of record in the file of this patent:

UNITED STATES PATENTS

| Number | Name | Date |
|---|---|---|
| 789,336 | Poulsen | May 9, 1905 |
| 1,142,384 | Tiffany | June 8, 1915 |
| 1,773,594 | Merriman | Aug. 19, 1930 |
| 1,934,320 | Nowosielski | Nov. 7, 1933 |
| 1,971,028 | Bothe | Aug. 21, 1934 |
| 2,017,855 | Foster et al. | Oct. 22, 1935 |
| 2,069,841 | Massoneau | Feb. 9, 1937 |
| 2,086,130 | Hickman | July 6, 1937 |
| 2,219,030 | Curtis | Oct. 22, 1940 |
| 2,235,126 | Towne | Mar. 18, 1941 |
| 2,252,302 | Kiel | Aug. 19, 1941 |
| 2,277,207 | Chenoweth | Mar. 24, 1942 |
| 2,318,828 | Yerkovich | May 11, 1943 |
| 2,356,145 | Begun | Aug. 22, 1944 |
| 2,418,541 | Camras | Apr. 8, 1947 |
| 2,419,476 | Begun | Apr. 22, 1947 |
| 2,422,143 | Somers | June 10, 1947 |

FOREIGN PATENTS

| Number | Country | Date |
|---|---|---|
| 329,804 | Germany | May 17, 1919 |
| 454,472 | Netherlands | Mar. 16, 1939 |
| 459,035 | Great Britain | June 10, 1941 |